F. E. INGERSOLL.
HERMETICALLY SEALED FOOD PACK.
APPLICATION FILED NOV. 6, 1913.
1,099,603.
Patented June 9, 1914.
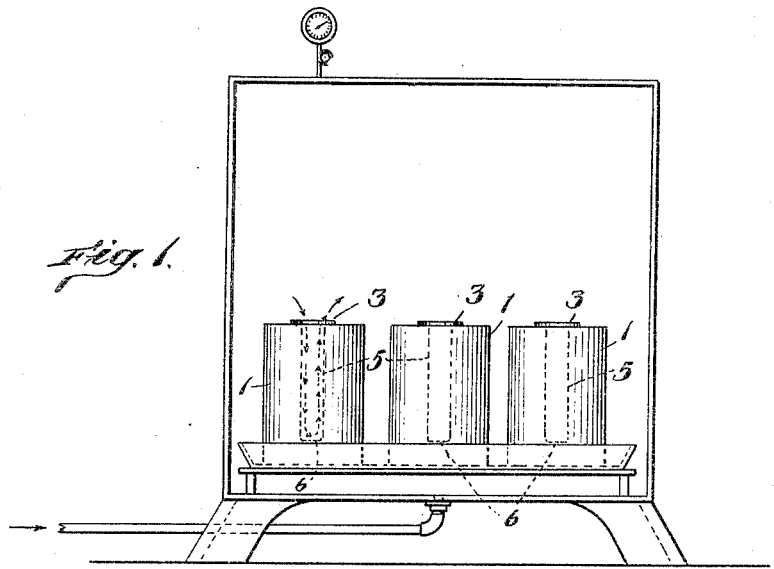
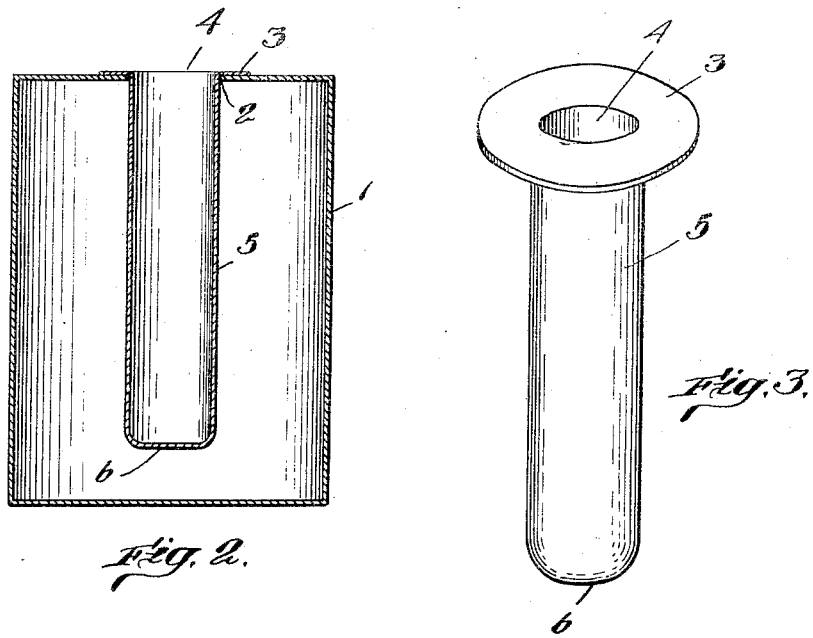
Witnesses:
H. B. Davis.
Geo. B. Rawlings.
Inventor:
Frank E. Ingersoll,
by
Attorney

UNITED STATES PATENT OFFICE.

FRANK ELLIS INGERSOLL, OF PORTLAND, MAINE.

HERMETICALLY-SEALED FOOD-PACK.

1,099,603.  Specification of Letters Patent.  Patented June 9, 1914.

Application filed November 6, 1913. Serial No. 799,580.

*To all whom it may concern:*

Be it known that I, FRANK E. INGERSOLL, a citizen of the United States, residing at Portland, county of Cumberland, State of Maine, have invented certain new and useful Improvements in Hermetically-Sealed Food-Packs, of which the following is a specification.

This invention relates to the art of packing food or food stuffs and particularly to the canning of vegetables, fruits and the like in hermetically sealed containers in which the contents are cooked.

The canning of foods which are subject to deterioration or decay is one of peculiar difficulty and one in the improvement of which a great deal of time and money has been spent and in which considerable progress has been made. Long experience has taught the necessity of hermetically sealed cooking to secure permanency of the content but this cooking within a hermetically sealed container continues to be attended by serious difficulties. One of these difficulties which has seriously affected the whole successful practice of the art has been that of completely cooking certain articles in certain bulks.

My invention is capable of application to the art quite generally although certain branches of the industry are more importantly related than others. For example, the packing of corn presents some peculiarities which illustrate the difficulty of the situation and the advantages of my invention. Corn packed in a No. 2 can for example which is cooked for sixty minutes at a temperature of 240° F. received approximately five minutes of actual cooking at the central core. It is therefore possible to pack corn in cans of this size and have it available in satisfactory condition for use. In the larger packs, however, as for example the No. 10 cans, which contain approximately one gallon, cooking must be maintained for an hour and a half in water at 212° and then for at least an hour at 246° F. thereafter. This is absolutely necessary in order to thoroughly cook the interior of the pack. This sustained cooking seriously affects the appearance and probably the quality of the product. The longer the application of heat, the darker the corn becomes and the more liable to lose its form and consistency. The dietetic value of food articles in attractive form is well recognized. It is not merely a catering to fancy but an absolute factor in the assimilation of the food by the consumer.

The object of my invention is therefore the shortening of the necessary period in the cooking of the packed food. To this end I provide a unit pack capable of practical commercial handling in which the period of cooking may be so reduced as to eliminate the liability of undesirable effects of long sustained heat.

The practice of my invention will be more fully described in the specification which follows, particular reference being had to the means by which I secure the results above indicated.

As illustrative of my invention, I have shown in the accompanying drawings a container or unit pack in accordance with my invention in its preferred form and have indicated the manner of treatment of the container to secure the results desired.

Throughout specification and drawings like reference numerals are employed to indicate corresponding parts, and in the drawings:

Figure 1 is a view of a plurality of my unit packs arranged under the action of steam treatment, Fig. 2 is a central vertical section of a container and closure in accordance with my invention, and Fig. 3 is a view of a closure removed.

In the practice of my invention I employ the usual containers or cans 1 generally used in packing. This can 1 is closed completely at one end and at the other end has a filling opening 2 through which the content is inserted and which is hermetically sealed after the filling. With this container I employ a closure 3 which corresponds in form generally with the usual can cap. This closure may be of any desired form, hemmed or unhemmed. Centrally of this cap is an opening 4 in which is fixed a tube 5 closed at its lower end 6. The tube 5 is preferably just a little shorter than the depth of the can 1 so that when the closure or cap 3 is set in place on the opening 2 the tube extends toward but not quite to the bottom of the container 1.

In practice I first fill the containers in the usual manner with the food stuff which is to be preserved. I then apply the caps 3 to close the openings 2 with the tubes 5 inserted down through the content of the can 1. Each cap 3 is then soldered in place and the sealed can subjected to the usual cooking in the retort. In this manner, I am able very materially to reduce the time of sustained heat, on account of the accessibility of the heat to the interior of the pack and the resultant article is therefore of a superior quality.

Mechanically the device is most conveniently adapted to general usage. In filling, the can has its usual accessibility from filling opening 2. In opening the central tube not only does not interfere with the delivery of the content but assists in the removal of the same. This is true whichever end of the can is cut open. If it happened that the capped end of the can be cut away the tube in the center is removed and the interior of the content freed by its withdrawal. If the opposite end of the can is cut away the entire end is left open due to the fact that the tube is shorter than this can. In either case free delivery is assured.

Various modifications may obviously be made in the construction of the containers with which my invention may be practised. Various forms and shapes of tubes may be used extending partly or wholly through the can, carried in the can itself or by the closure as shown in its preferred form, all within the scope of my invention if within the limits of the appended claims.

What I therefore claim and desire to secure by Letters Patent is:

1. A hermetically sealed pack consisting of a container, a cooked food content therein, said container having a passage centrally thereof and opened at one end to the exterior of the container.

2. A hermetically sealed pack consisting of a container, a cooked food content therein, said container having a tube extending therein and opened at one end for the introduction of a cooking medium.

3. A hermetically sealed pack consisting of a container, a cooked food content therein, said container having a filling opening, a cap for said opening, and a tube opening through said cap at its outer end, and projecting within the container but slightly shorter than the depth of the container and closed at its inner end.

In testimony whereof I affix my signature in presence of two witnesses.

FRANK ELLIS INGERSOLL.

Witnesses:
  HENRY G. INGERSOLL,
  JULIA S. INGERSOLL.

---

Copies of this patent may be obtained for five cents each, by addressing the "Commissioner of Patents, Washington, D. C."